US007166181B2

(12) United States Patent
Cable

(10) Patent No.: US 7,166,181 B2

(45) Date of Patent: Jan. 23, 2007

(54) WOOD-GLUING AND CLAMPING SYSTEM

(76) Inventor: Eric Cable, Box 945, 3028 Park Drive, Golden, BC (CA) V0A 1H0

( * ) Notice: Subject to any disclaimer, the term of this patent is extended or adjusted under 35 U.S.C. 154(b) by 0 days.

(21) Appl. No.: 10/834,788

(22) Filed: Apr. 29, 2004

(65) Prior Publication Data

US 2004/0200546 A1 Oct. 14, 2004

Related U.S. Application Data

(62) Division of application No. 09/892,142, filed on Jun. 26, 2001, now Pat. No. 6,779,576.

(51) Int. Cl.
*B32B 37/00* (2006.01)

(52) U.S. Cl. .............................. 156/304.5; 156/304.1; 156/539; 156/558; 144/344

(58) Field of Classification Search ............ 156/304.1, 156/538, 539, 556, 558, 559, 566, 574, 304.5, 156/580; 144/344
See application file for complete search history.

(56) References Cited

U.S. PATENT DOCUMENTS

| | | | | |
|---|---|---|---|---|
| 2,537,918 | A * | 1/1951 | Skoog | 156/558 |
| 3,927,705 | A | 12/1975 | Cromeens et al. | |
| 4,128,119 | A | 12/1978 | Maier | |
| 4,294,647 | A | 10/1981 | Strickler | |
| 4,314,871 | A | 2/1982 | Weinstock et al. | |
| 4,565,597 | A | 1/1986 | Schulte | |
| 4,941,521 | A | 7/1990 | Redekop et al. | |
| 5,617,910 | A | 4/1997 | Hill | |
| 5,679,191 | A | 10/1997 | Robinson | |
| 5,888,620 | A | 3/1999 | Grenier | |
| 6,025,053 | A | 2/2000 | Grenier | |
| 6,843,877 | B2 * | 1/2005 | Risi | 156/304.5 |

FOREIGN PATENT DOCUMENTS

| | | |
|---|---|---|
| DE | 1 921 905 | 11/1970 |
| DE | 39 21 368 | 10/1990 |
| DE | 41 15 393 | 11/1992 |
| GB | 746135 | 3/1956 |
| GB | 1054881 | 1/1967 |
| GB | 1109040 | 4/1968 |

OTHER PUBLICATIONS

Pamphlet: "Competence makes all the difference" AT-INOVA, Apr. 1999.

(Continued)

*Primary Examiner*—James Sells
(74) *Attorney, Agent, or Firm*—Andrus, Sceales, Starke & Sawall, LLP

(57) ABSTRACT

The invention relates to an wood-gluing system enabling the continuous production of glued pieces of lumber for panels and the like. The system includes a deck, a horizontal displacement system for advancing lumber across the deck, a braking system, a one-way clamping system and an upstream pressure system. The system may be used in conjunction with finger-jointing processes or with single pieces of lumber and may be used for the production of both furniture grade and construction grade wood products.

7 Claims, 6 Drawing Sheets

OTHER PUBLICATIONS

Pamphlet: "AT-INOVA LLP-2500A LLP-3000A", AT-INOVA, Apr. 199.

Pamphlet: "Edge Gluing System", Mann-Russell Electronics, 1992.

Pamphlet: "Finger End-Joint Gluing Systems", Mann-Russell Electronics, 1992.

Pamphlet: "Beam and Decking Laminators", Mann-Russell Electronics, 1992.

Pamphlet: "Panel End-Joint Gluing Systems", Mann-Russell Electronics, 1992.

* cited by examiner

WOOD-GLUING AND CLAMPING SYSTEM

CROSS-REFERENCE TO RELATED APPLICATION

This application is a divisional of application Ser. No. 09/892,142, filed Jun. 26, 2001 now U.S. Pat. No. 6,779,576.

FIELD OF THE INVENTION

The invention relates to a wood gluing and clamping system enabling the continuous production of edge or face glued pieces of lumber for panels and the like. The system includes a deck, a horizontal displacement system for advancing lumber across the deck, a braking system, a one-way clamping system and an upstream pressure system. The edge-gluing system may be used in conjunction with finger-jointing processes or with single pieces of lumber and may be used for the production of both furniture grade and construction grade wood products.

BACKGROUND OF THE INVENTION

In the lumber industry, it is well known that wood boards can be edge-glued to create larger panels of wood or face-glued to create beams.

It is also known that the scrap wood from various high-end lumber operations such as sawmill operations contain useful quantities of wood fibre which can be salvaged for lower-end lumber operations including the production of finger-jointed wood products. Finger-jointing processes cut usable wood fibre from scrap material and through shaping, gluing and clamping the ends of the scrap material create longer lengths or boards of lumber. The resulting longer boards built up from shorter lengths have advantages over equivalent lengths of solid, single piece lumber including 1) they will often be cheaper, 2) using certain glues, they will often have structural strengths equivalent to or greater than the strengths of an equivalent length of solid, single-piece lumber and, 3) longer, stable and straight boards of lumber (typically up to 62 feet) can be created.

As with solid, single-piece boards, finger jointed boards can be utilized as conventional lumber (ie for framing) or can be edge-glued and/or face-glued to create other lumber products. In particular, edge-glued lumber can be used to create slabs and face-glued lumber can be used to create beams.

Over the years, many techniques for finger jointing have evolved and continue to evolve both with respect to materials handling aspects of the process as well as with the gluing technology. For example, and with respect to gluing technology, in high speed operations producing finger jointed lumber, it is desirable that glue set times are fast in order to maintain high throughput levels. However, high-speed gluing requires that a careful balance be maintained between the glue set time and production speed to ensure that the glue sets during the clamping phase of assembly and not too early or too late in the process. In particular, a glue setting too early in the process will prevent proper assembly of the finger-jointed pieces whereas a glue setting too late will require longer clamping times.

Past glues have included phenol based glues which through a combination of moisture and heat-activation (microwaves) initiate the glue setting which in combination with the joint structure provide the resulting adhesive and structural strength at the joint. However, heat-activated glues utilizing microwaves require complex tunnels to both emit the microwaves and shield the plant from this radiation. In addition, the technology relating to products manufactured from phenol glues lend themselves to batch processes as opposed to continuous flow production by virtue of glue-setting apparatus. This is particularly true with respect to an edge gluing process.

As a result of some of the problems of phenol glues, quick-setting polyurethane glues have been developed and incorporated into high speed finger jointing operations. Polyurethane glues require moisture for setting which must introduced into the process and which therefore lend themselves to use with gluing green or wet-wood. Furthermore, polyurethane glues do not require the same specialized clamping and setting equipment and thus lend themselves to continuous production processes without the more complex glue-setting tunnels.

The equipment presently used in the continuous production of single lengths of lumber initially creates a finger joint on the ends of each piece of wood. Glue is applied to each finger joint and each piece of wood is moved onto a linear shuttle which accelerates successive pieces of wood against and into a leading piece of wood thereby causing adjacent finger joints on each piece of wood to interlock. At the end of the shuttle run, the assembled pieces are stopped against a first clamping surface, trimmed to length, moved sideways out of the shuttle run whereupon a longitudinal clamping pressure is applied to fully engage the finger joints. The resulting length of lumber is released from the clamp onto a horizontal deck to allow for final curing of the glue. As successive pieces of lumber are created, cut to length, moved sideways, clamped and released onto the horizontal deck, each piece of lumber is horizontally displaced across the deck. At the edge of the deck, each piece is removed for final processing, cleaning and packaging.

In the past, individual boards of single-piece or finger-jointed lumber could be subsequently assembled by edge-gluing to create slabs or face-glued to create beams in one or more separate operations to the milling or finger-jointing processes.

For example, past edge-gluing processes apply glue to the edges of adjacent boards and clamp and press adjacent boards together while the glue is curing to form a slab. However, such processes are generally non-continuous, slow and/or labour-intensive which results in higher production costs than could be achieved if the slab was created as part of the initial milling or finger-jointing assembly process.

Accordingly, there has been a need for an edge or face gluing process and apparatus that provides the continuous assembly of lumber into edge-glued or face-glued slabs at high speed and pressure.

Another problem with past wood-gluing equipment is the clamping pressure profile applied to a growing slab. That is, in past systems which may apply a clamping pressure across a growing slab, as each successive board is added to the growing slab, there are substantial changes in the clamping pressure as linear shuttles advance and retreat. Accordingly, there has been a need for an wood-gluing process and apparatus which provides a high, continuous clamping pressure across the width of the slab while additional boards are being prepared and added to the slab.

Further still, there is a distinction between panels manufactured for furniture and for construction. In particular, construction grade lumber requires that the strength of any glued joint is greater than that of the wood whereas furniture grade wood does not require the same joint strength or integrity. In manufacturing construction grade lumber from glued pieces of wood, either finger jointed or edge-glued, in order to ensure that there is maximum joint strength, high clamping pressures are required to ensure proper glue penetration into the wood during the curing cycle and particularly in continuous flow operations. Such techniques are required to have lumber certified by certification agencies.

Past edge-gluing systems have not solved these problems. A review of the prior art has revealed U.S. Pat. No. 6,025,053 and U.S. Pat. No. 5,888,620 (Grenier) which disclose a process for adhesively bonding finger jointed lengths of wood in side-by-side relationship to form boards; U.S. Pat. No. 4,314,871 (Weinstock) which discloses a method and apparatus for laminating timber to form laminated beams; U.S. Pat. No. 4,565,597 (Schulte) which discloses a method for producing a veneer web which are bonded side-by-side to form a veneer web; U.S. Pat. No. 5,679,191 (Robinson) which discloses a method and apparatus of fabricating trailer flooring via an edge-gluing process and U.S. Pat. No. 3,927,705 (Cromeens), U.S. Pat. No. 4,128,119 (Maier), U.S. Pat. No. 4,941,521 (Redekop) and U.S. Pat. No. 5,617,910 (Hill) which each disclose finger jointing apparatus per se.

SUMMARY OF THIS INVENTION

The invention solves the above problems by providing a high-speed clamping system that maintains a horizontal clamping pressure across the width of a growing slab while exposing the trailing edge of the growing slab for addition of a further board. In addition, the clamping system allows for the horizontal displacement of the growing slab away from a shuttle delivering a further board for ultimate removal from the system.

More specifically, and in accordance with the invention, there is provided an apparatus for applying a consistent clamping pressure between a plurality of boards comprising:

a) a deck for supporting a plurality of boards, the deck having an upstream end and downstream end;

b) a horizontal displacement system operatively connected to the upstream end for applying a downstream force to the plurality of boards, the horizontal displacement system operable between a disengaged position allowing a new board to be positioned adjacent the upstream end and an engaged position where the plurality of boards is advanced towards the downstream end;

c) a braking system operatively connected to the downstream end for retarding advancement of the plurality of boards along the deck when the downstream force is below a threshold pressure and for allowing advancement of the plurality of boards if the downstream force exceeds the threshold pressure, the braking system including an upstream pressure system for applying an upstream pressure to the plurality of boards when the horizontal displacement system is moving from the engaged position to the disengaged position; and, d) a one-way clamping system operatively connected to the deck for preventing upstream movement of the plurality of boards when the horizontal displacement system is moving from the engaged position to the disengaged position.

In another embodiment, a system for maintaining a high inter-joint pressure across a plurality of glued boards being continuously assembled on a deck is provided, comprising a downstream pressure system, a braking system, an upstream pressure system and a clamping system operatively connected to the deck.

In a further embodiment, the invention provides a method of maintaining a high inter-joint pressure between a plurality of boards being assembled into a panel or beam comprising the steps of:

a) advancing a board across a deck by a horizontal displacement system through a clamping system restricting the upstream movement of the board; and b) restricting the downstream movement of the plurality of boards with a braking system having a threshold pressure, the braking system further providing an upstream pressure against the clamping system.

DESCRIPTION OF THE DRAWINGS

These and other features of the invention are described with reference to the drawings wherein.

DETAILED DESCRIPTION OF THE INVENTION

System Overview

Figure 1:
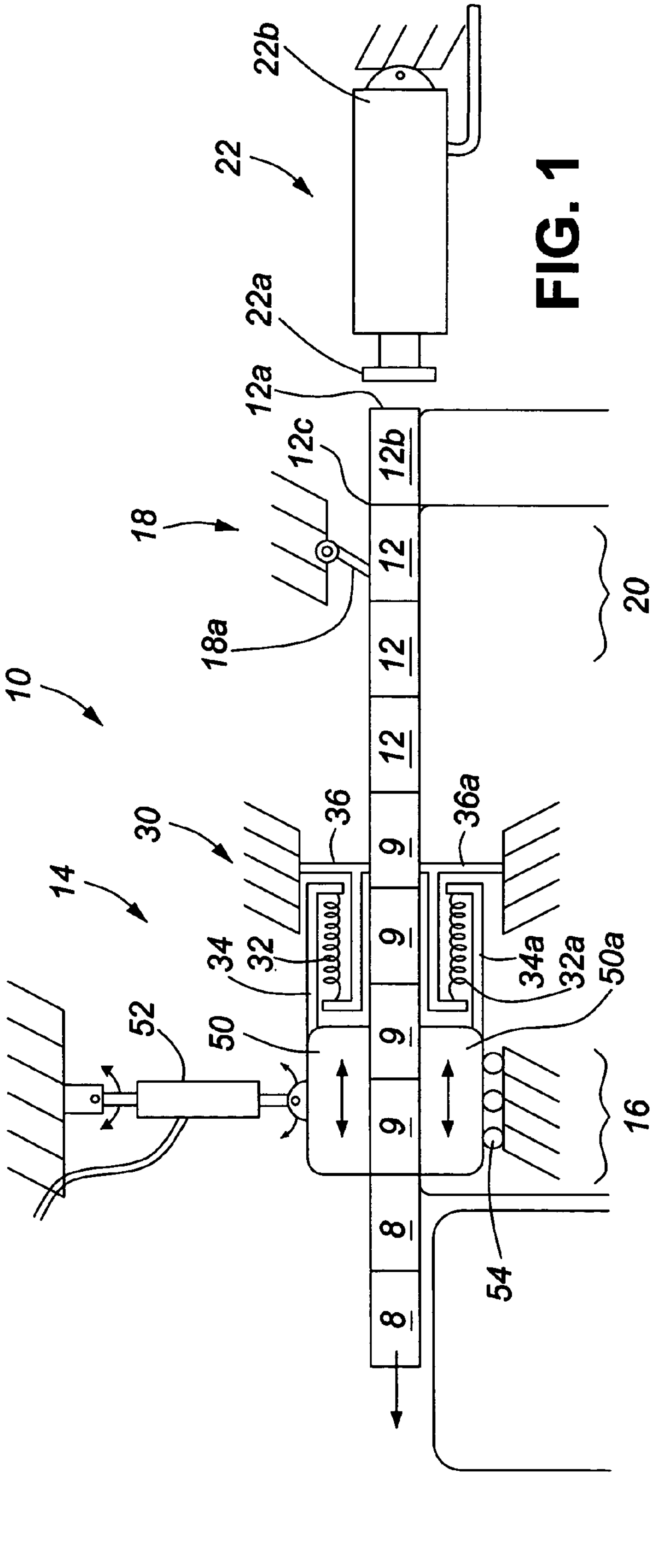
FIG. 1 is a schematic side view of a wood clamping system in accordance with one embodiment of the invention.

In accordance with the invention and with reference to the figures, a wood gluing and clamping system 10 is described which provides a continuous clamping pressure across a deck 11 of a growing slab or panel of glued lumber 12. The system 10 generally includes a deck 11, a braking system 14, a series of one-way clamps 18 and a horizontal displacement system 22 for forming a panel of edge-glued lumber or a beam of face-glued lumber. The following description is written in the context of an edge-gluing system although it is understood that the system may be used in the same manner for face-gluing.

In operation, a slab or panel of edge-glued boards (shown as panels 8, 9 and 12 in FIGS. 1 and 2) is created by successively shuttling a new board 12*b* past a glue station 13 to the trailing end 20 of the deck 11 whereupon the horizontal displacement system (HDS) 22 applies a sideways and translational force to the trailing edge 12*a* of the board 12*b*, thereby causing board 12*b* to engage with the edge 12*c* of a previously positioned board. As the new board 12*b* engages with the previously positioned board, the HDS meets resistance and the interface clamping pressure between boards 12 and 12*b* increases as the HDS continues to apply a translational force. The interface clamping pressure increases across the deck until each panel 8, 9, 12 is ultimately displaced across the deck in a step-wise manner. After the panels 8, 9, 12 are displaced are fixed amount (typically, the width of one board), the HDS retracts to an unengaged position to await the arrival of a new board.

As each panel 8, 9, 12 advances, a high pressure is maintained at each glue/board interface by the combination of the braking system 14 at the leading edge 16 of the slab and a series of one-way clamps 18 which prevent backward movement of the slab at the trailing edge 20 of the slab as the HDS moves to its unengaged position.

More specifically, as each panel 8, 9, 12 advances across the deck 11, the upper and lower surfaces of each panel are engaged by the braking system which retards the advancement of the panel 12 along the deck 11 by applying a squeezing pressure against the upper and lower surfaces of the specific panel (panel 9 in FIGS. 1 and 2) engaged with the braking system. The braking system 14 has a threshold pressure which prevents movement of the panel 9 through the braking system if the threshold pressure is not exceeded but allows the panel 9 to pass through the braking system 14 once the threshold pressure is exceeded. Horizontal pressure against the braking system 14 is provided by the HDS 22. In the embodiment shown in FIG. 1, the braking system 14 frictionally engages with the upper and lower surfaces of the panel at the upstream end 16 of the deck 11.

Figure 1A:
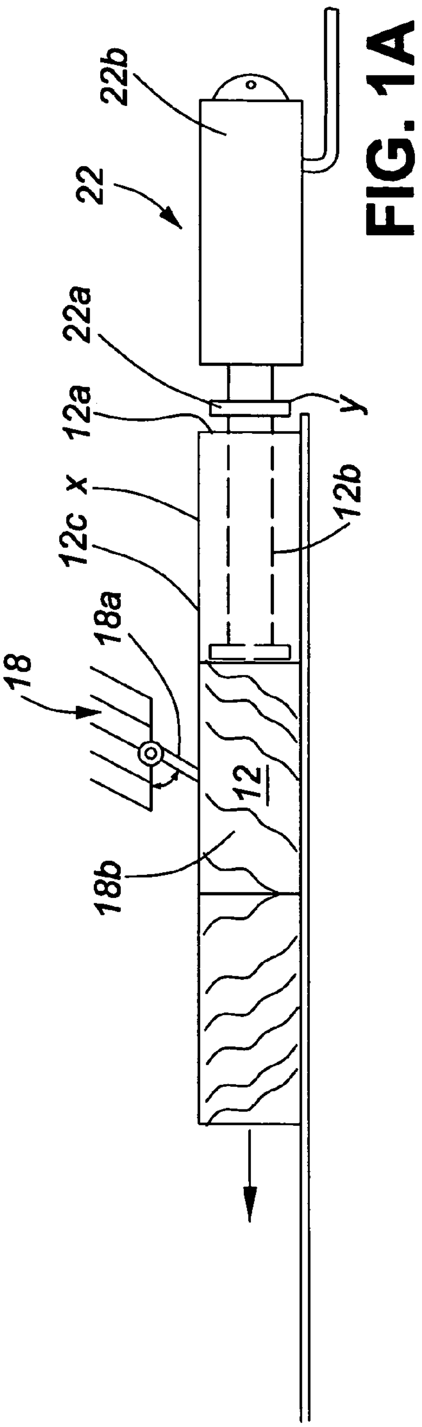
FIG. 1*a* is a schematic side view of the horizontal displacement system showing the engaged and disengaged positions.

As shown in FIG. 1*a*, the HDS operates between an unengaged position in which it is not making contact with the upstream edge 12*a* of the slab and an engaged position in which it is in contact with the upstream edge 12*a* of the slab and pushing the slab 11 through both the braking system 14 and one-way clamps 18.

As pressure from the HDS 22 is released as the HDS moves from the engaged to the disengaged position, the one-way clamps prevent significant movement of the slab 12 in an upstream direction.

Figure 2:
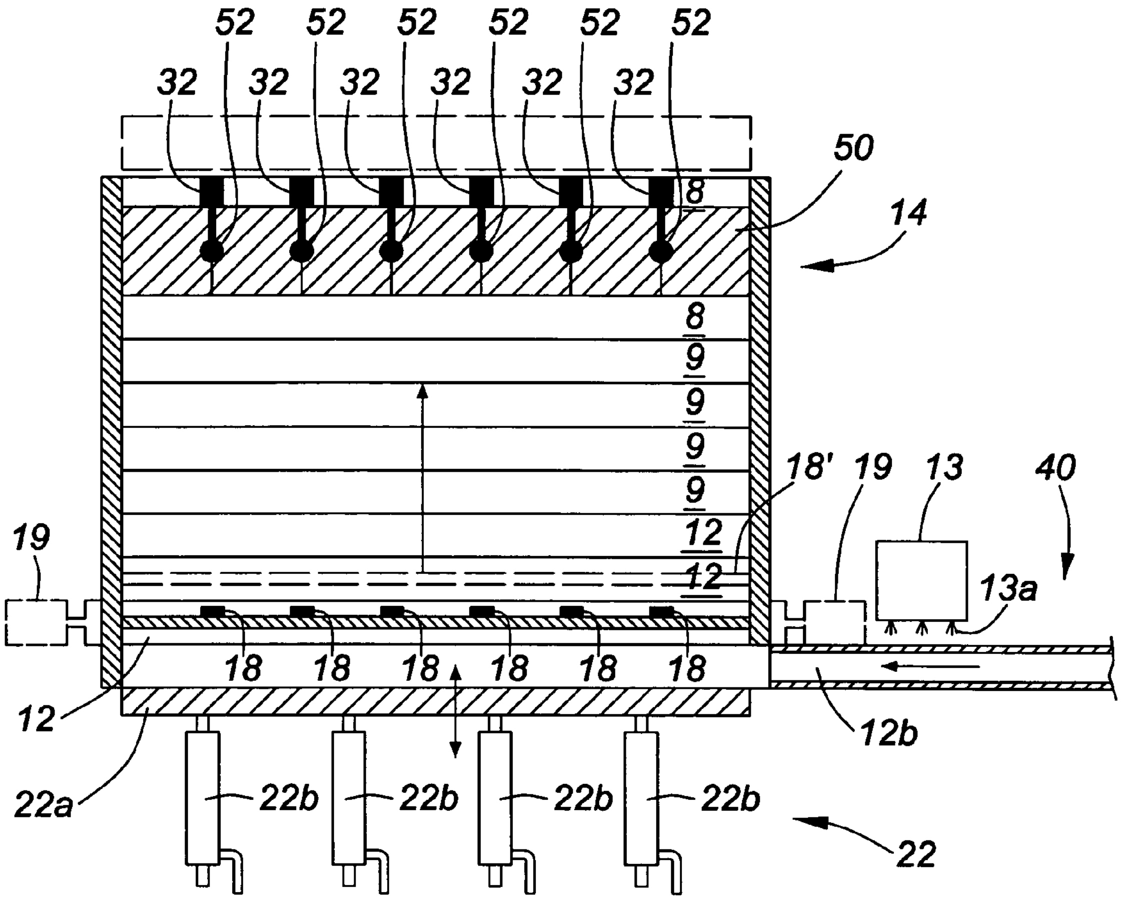
FIG. 2 is a schematic plan view of the wood clamping system in accordance with two embodiments of the invention, the first in conjunction with edge-gluing single pieces of lumber and the second in conjunction with a finger-jointing process.

Importantly, the braking system 14, in addition to retarding forward motion of the slab, also provides an upstream clamping pressure against the panels 9, 12. That is, as the HDS is moving from the unengaged position to the fully engaged position and is increasing the displacement pressure, the HDS is initially overcoming an upstream pressure from upstream pressure system 30 and secondly, is overcoming the threshold pressure of the braking system 14. As shown, the upstream pressure system 30 includes a plurality of springs 32 spaced along the braking element in the embodiments shown in FIGS. 1 and 2. As explained in greater detail below, FIG. 1 shows an embodiment where the upstream pressure system is upstream of the braking system 14 and FIG. 2 shows an embodiment where the upstream pressure system is downstream of the braking system 14.

Figure 5:
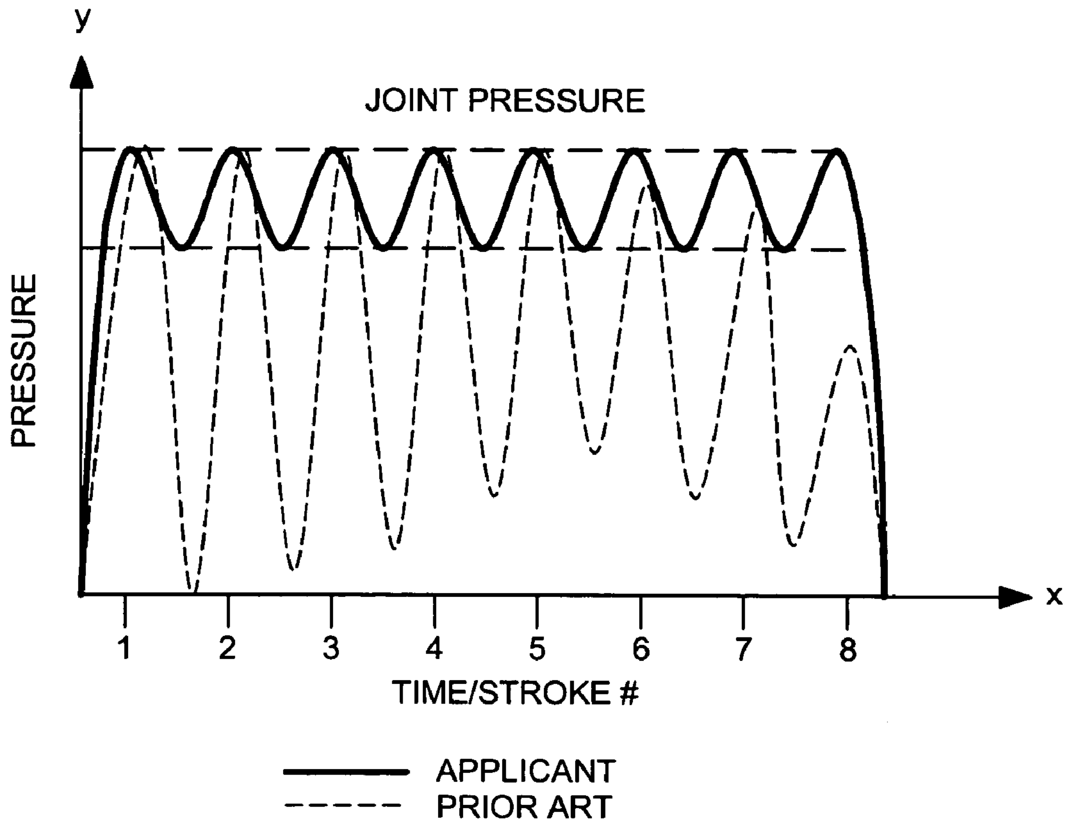
FIG. 5 is a graph showing inter-board joint pressure as a function of time.

After the HDS reaches a filly extended position (designated position x as shown in FIG. 1*a*), the HDS reverses direction and returns to the fully disengaged position (designated position y in FIG. 1*a*). The new trailing edge 12*a* of the slab 12 is prevented from upstream movement by the one-way clamping system 18 with the upstream pressure system maintaining a high joint pressure. As shown in FIG. 5, as the HDS moves to the disengaged position and the upstream pressure elements apply an upstream force against the panel, the joint pressure will decrease slightly but will be maintained within a high but narrow pressure range. This is contrasted with the typical joint pressure profile of the prior art as also shown in FIG. 5. By virtue of the high joint pressure across the deck, glue penetration, and hence joint strength makes the subject invention particularly suitable for the manufacture of construction grade lumber.

As indicated above, the system may be used to create edge-glued panels or face-glued beams from both single-piece boards and multi-piece finger-jointed boards. It is also understood that the system be used for both furniture grade and construction grade products.

Further details and embodiments of the sub-systems are described below:

Horizontal Displacement System

The horizontal displacement system 22 includes a board contacting member 22*a* running the length of the deck 11 and positioned at the upstream end of the deck 11. In most implementations of the system, the board contacting member will typically range in length from 10–62 feet as may be determined by the actual deployment of the system 10 and the desired end product. Translational actuation of the board contacting member 22*a* is realized by a plurality of hydraulic units 22*b* operatively connected to the board contacting member 22*a* and to a fixed surface (not shown). The number and spacing of the hydraulic units 22*b* is determined by the performance specifications of each hydraulic unit and the desired inter-joint pressures. Appropriate hydraulic control of each hydraulic unit is provided by an appropriate hydraulic control unit (not shown) to provide synchronous actuation of all the hydraulic units 22*b*.

Braking and Upstream Pressure System

The braking system 14, as described above, functions to retard the advancement of each panel across the deck when the HDS 22 is applying a pressure below the threshold pressure and to allow advancement of the panel through the braking system when the threshold pressure is exceeded. The upstream pressure system 30 functions to maintain an upstream pressure against each panel when the HDS is moving to the fully disengaged position and moving to the fully engaged position but below the threshold pressure.

As shown in FIGS. 1–4, the braking system includes at least one friction plate 50 and a hydraulic cylinder 52. The friction plate 50 applies a downward pressure against the upper surface of the panel 9 as applied by the hydraulic cylinder 52. In the embodiment shown in FIGS. 1 and 3, a second friction plate 50*a* is provided on the underside of the deck 11.

The upstream pressure system 30 includes at least one spring 32 which biases the friction plate 50 upstream. As shown in FIG. 1, the upstream pressure system may include both topside 32 and underside 32*a* springs. FIG. 1 also shows an embodiment in which the upstream pressure system is positioned upstream of the friction plate 50 where springs 32, 32*a* compressible within supporting brackets 34, 34*a*, 36 and 36*a* secured to the friction blocks 50, 50*a* and an immovable surface, respectively. The underside friction block 50*a* is preferably supported on rollers 54 which allow the friction block to travel upstream/downstream as required. Hydraulic cylinder 52 may be pivoted to allow this travel.

The friction blocks 50, 50*a* may be any suitable hard-wearing material which provides sufficient frictional contact with the wood panel to prevent slippage and maintain a consistent threshold pressure. Typical friction blocks may be manufactured from materials such as square metal tubes or plastic blocks.

Figure 3:
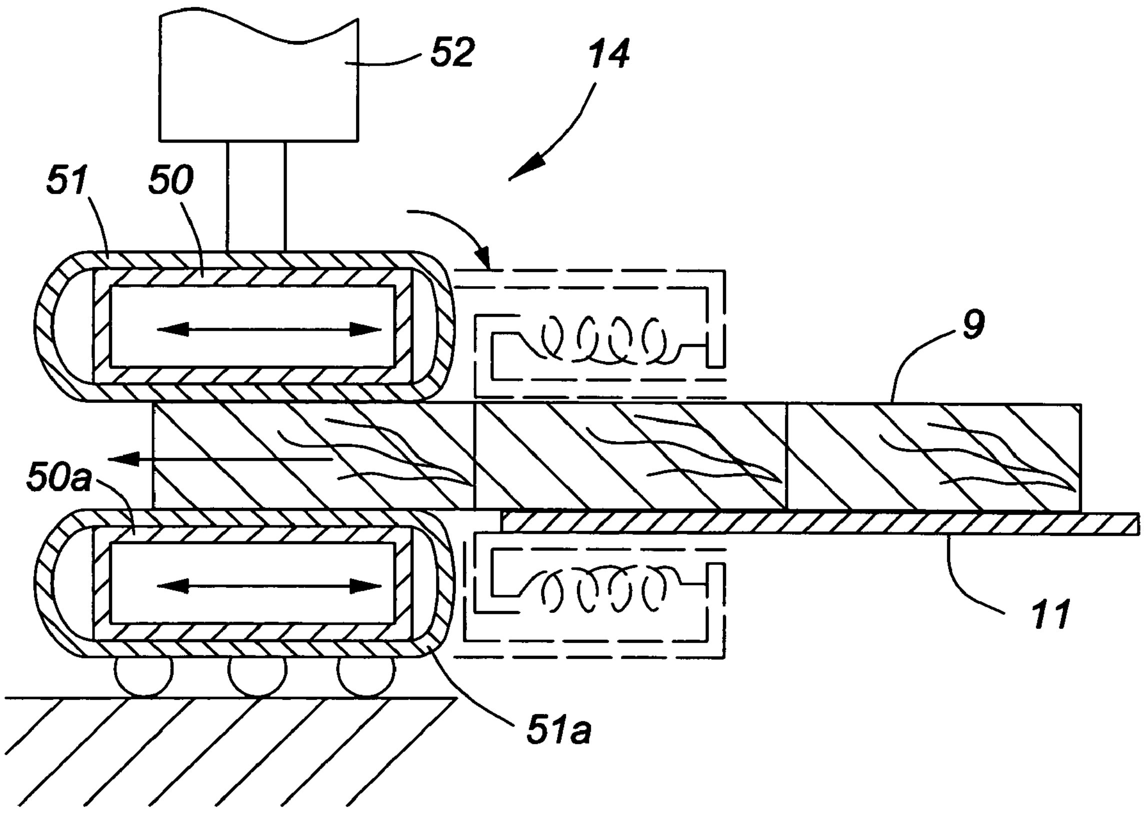
FIG. 3 is a schematic side view of the braking system in accordance with one embodiment of the invention.
Figure 4:
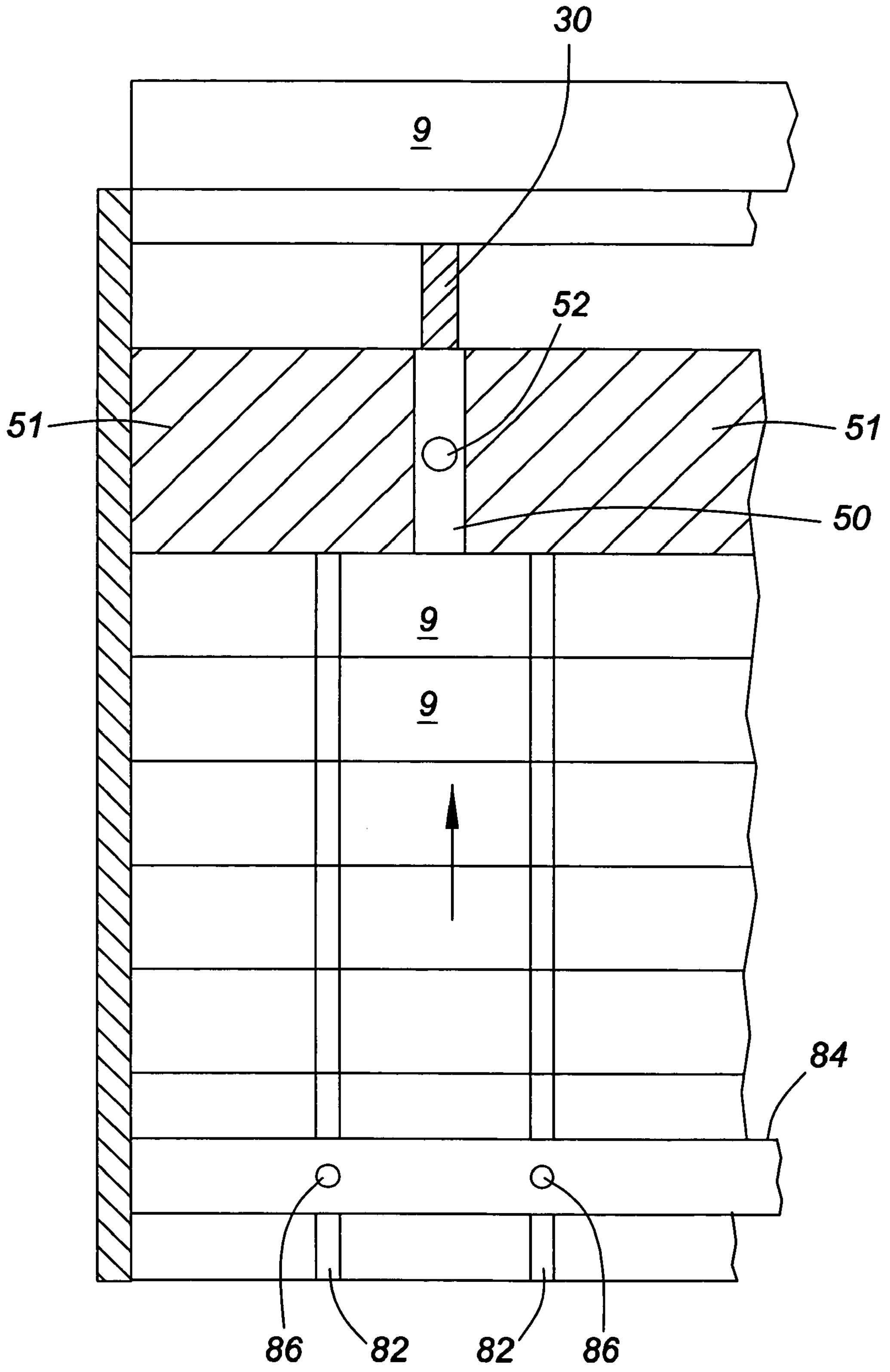
FIG. 4 is a schematic plan view of the braking, the back-pressure and panel press systems in accordance with one embodiment of the invention.

As shown in FIGS. 3 and 4, the friction blocks 50, 50*a* may also include a rubber sleeve 51, 51*a* which is placed over each block. In this embodiment, the rubber sleeve may rotate around the block 50, 50*a* as each panel is advanced along the deck. The use of rubber sleeves reduces the polishing of the friction blocks which may improve the consistency of the threshold pressure.

As indicated above, the upstream pressure system 30 may be positioned upstream or downstream of the friction blocks. As depicted in FIGS. 1 and 3, the upstream pressure system is upstream of the braking system. As depicted in FIGS. 2 and 4, the upstream pressure system is downstream of the friction blocks.

Furthermore, as shown in FIGS. 2 and 4, the braking system and upstream pressure system may include a number of individual elements spaced along the width of the deck. As shown in FIG. 2, a single and continuous friction block 50 extends along the width of the deck. As shown in FIG. 4, rubber sleeves as described above are positioned between adjacent hydraulic cylinders 52 around friction block 50.

Other embodiments of the braking system may include systems in which the friction block is a roller operatively connected to a disc brake having a threshold pressure which, once exceeded allows the panel to pass beneath. Still further systems may include chains and rollers.

One Way Clamping System

The one way clamping system 18 includes at least one clamping member or dog 18*a* (as shown in FIGS. 1, 1*a*, and 2) pivotally connected to an immovable surface. The clamping member 18*a* is angled downstream and pressured to engage the panel 12 such that if an upstream pressure is applied to the panel, the clamping member engages the panel and wedges the panel downwardly and prevent significant upstream movement. The wood contacting surface of the clamping member is designed to inflict minimal damage to the surface of the panel and, as such, may include a knurled and/or rubberized wood-contacting surface 18*b* as would understood by one skilled in the art. As shown in FIG. 2, a plurality of clamping members are distributed along the length of the deck as required to provide sufficient holding force from the upstream pressure system 30.

Figure 4A:
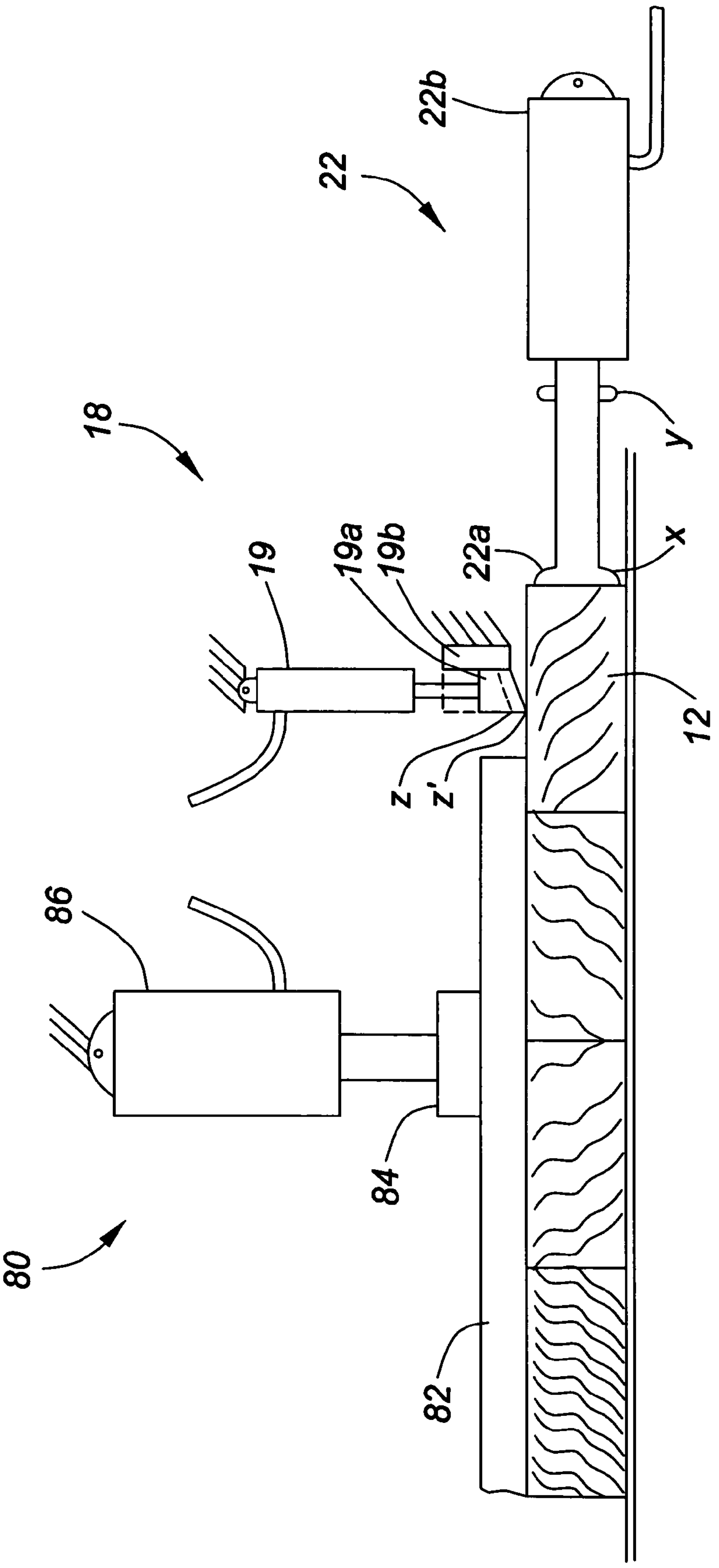
FIG. 4*a* is a schematic side view of the panel press system and an alternate embodiment of the clamping system in accordance with different embodiments of the invention.

In a further embodiment of the one-way clamping system, the wood contacting surfaces of the clamping system are manually actuated to engage with the panel just prior to the moment when the HDS 22 begins to move from the fully engaged position to the full disengaged position until the threshold pressure is reached on the next stroke. As shown in FIG. 4*a*, the one-way clamping system includes a hydraulic cylinder 19 having a wood contacting member 19*a* for movement into and against the panel 12. A back-stop member 19*b* prevents backward or upstream movement of the wood contacting member 19*a*. Accordingly, as the HDS 22 moves from the fully disengaged position, y, until the threshold pressure is reached and the panel begins to move forward, cylinder 19 is maintaining a downward pressure on the panel thereby resisting upstream movement of the panel by the upstream pressure system 30. As soon as the threshold pressure is reached by the HDS 22, wood contacting member 19*a* retracts from engaged position z' to disengaged position z allowing forward (downstream) movement of the panel 12. Wood-contacting member 19*a* may also be hinged allowing one-way (downstream) movement of a panel as described above.

Actuation of the cylinder 19 may be accomplished using position sensors (not shown) as is known in the art. For example, a position sensor may detect movement of the panel (corresponding to the threshold pressure) to cause the cylinder 19 to retract to position z. Similarly, a position sensor may detect board contacting member 22*a* just prior to position x, to cause cylinder 19 to advance to position z'.

Figure 5A:
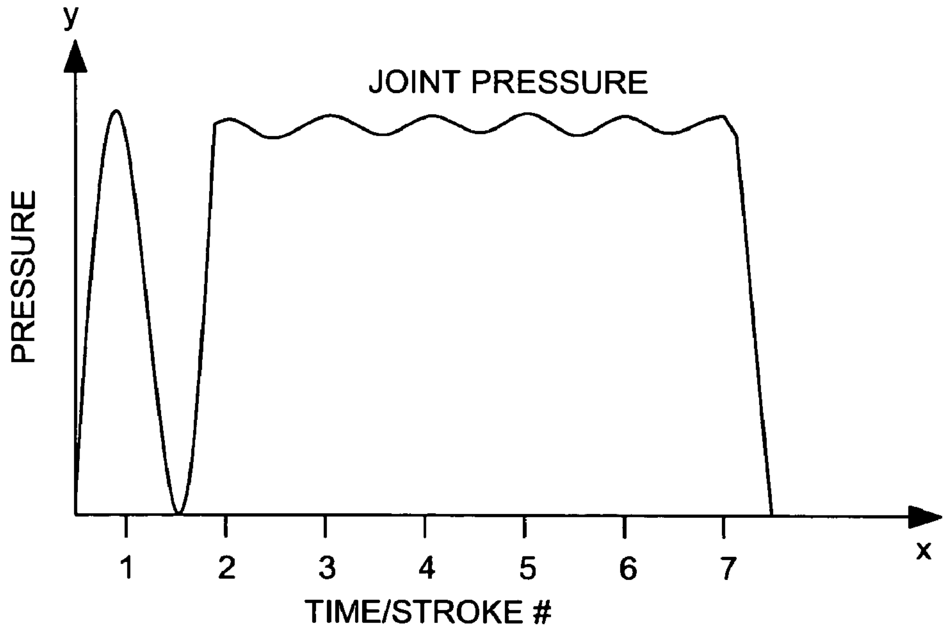
FIG. 5*a* is a graph showing inter-board joint pressure as a function of time in accordance with an alternate embodiment of the invention.

Use of mechanically actuated one-way clamping system will preferably reduce the range of inter-joint pressures as shown schematically for strokes 2–7 in FIG. 5*a*.

Panel Press System

In another embodiment of the wood-gluing system, a panel press system 80 is provided to assist in maintaining a flat panel (FIGS. 4 and 4*a*). The panel press system 80 preferably includes a plurality of rails 82 across the width of the deck. Transverse to the rails 82 is a pressure bar 84 for applying a downward force against the rails 82. Downward force on the pressure bar is provided by at least one hydraulic cylinder 86. The panel press system 80 generally provides a downward pressure to the upstream end of the deck to minimize joint misalignment between adjacent boards prior to the glue setting up. Accordingly, and by virtue of the generally upstream location of the pressure bar 84, a greater downward force is provided at the location of the deck where the glue may be acting more as a lubricant between boards as opposed to an adhesive.

It is preferred that narrow rails 82 are in contact with the panel surface to minimize the surfaces available for contamination by any excess glue seeping from a joint which may otherwise over time increase the potential for joint misalignment.

Glue Station

The glue station 13 is located adjacent the linear shuttle 40 and includes extruding applicators 13*a* for applying glue on edge 12*a* of a board 12*b* advancing along the linear shuttle 40. The glue station 13 has appropriate position sensors and control system to apply glue only as a new board is advancing and only as required for a specific panel width.

System Deployment

The system may be deployed as a stand-alone system either in a single-board or finger joint edge-gluing system or as fully integrated component of a finger jointing system. In a finger jointing system where it is required that a longitudinal clamping pressure be applied to assembled finger-jointed blocks, the location of the one-way clamping system 18 and control of the HDS may be modified. Specifically, in order to allow proper longitudinal clamping pressures to be applied to the finger-jointed boards and with reference to the elements of FIG. 2 in dotted lines, the one-way clamping system 18' (as shown in dotted lines) is positioned one-board width downstream of the IDS 22. Accordingly, after a plurality of loosely finger-jointed blocks are shuttled into position and the HDS 22 has advanced these blocks onto the deck, a longitudinal clamping system 19 is actuated to tightly interconnect the finger-jointed blocks. After the longitudinal clamping pressure has been applied and released, the next stroke of the HDS advances the board through the one-way clamping system 18'. FIG. 5*a* shows a joint pressure profile for a combined edge-gluing/finger-joint system. As can be seen, in this embodiment, a narrow and high joint pressure is not realized until stroke 2.

In a still further embodiment, the glued edges may be shaped upstream to provide interlocking between adjacent boards. In this embodiment, appropriate shapers are positioned upstream of the glue station 13 to shape one or more edges of boards or pieces.

System Control

The system can be controlled using programmable logic controllers having timers, pressure, temperature, flow and position sensors as is known in the art. In particular, appropriate control of the glue station will enable panels of different widths to be prepared.

Furthermore, while this description generally describes an edge-gluing system, it is understood that the faces of boards may be glued in a manner described above. Still further, edge-glued lumber prepared in accordance with the invention can be subsequently face glued for lamination into beams or used in vertical or horizontal structural applications.

The invention claimed is:

1. A method of maintaining a high inter-joint pressure between a plurality of boards being assembled into a panel or beam comprising the steps of:

a) advancing a board across a deck by a horizontal displacement system through a clamping system restricting the upstream movement of the board; and b) restricting the downstream movement of the plurality of boards with a braking system having a threshold pressure, the braking system further providing pressure in the upstream direction against the clamping system and;

c) maintaining a high inter-joint pressure between the plurality of boards while the horizontal displacement system is moving from an engaged position to a disengaged position.

2. A method as in claim 1 wherein the plurality of boards are manufactured from finger jointed blocks of wood and step a) further comprises applying a longitudinal clamping pressure to the finger jointed blocks prior to advancement through the clamping system.

3. A method for applying a consistent clamping pressure between a plurality of boards comprising the steps of:

supporting a plurality of boards on a deck, the deck having an upstream end and downstream end;

applying a downstream force to the plurality of boards with a horizontal displacement system operatively connected to the upstream end, the horizontal displacement system operable between a disengaged position allowing a new board to be positioned adjacent the upstream end and an engaged position where the plurality of boards is advanced towards the downstream end;

retarding advancement of the plurality of boards along the deck with a braking system operatively connected to the downstream end when the downstream force is below a threshold pressure and allowing advancement of the plurality of boards if the downstream force exceeds the threshold pressure, the braking system including an upstream pressure system for applying pressure in the upstream direction to the plurality of boards when the horizontal displacement system is moving from the engaged position to the disengaged position; and, opposing the pressure applied by the upstream pressure system, thereby preventing upstream movement of the plurality of boards and providing a high inter-joint pressure when the horizontal displacement system is moving from the engaged position to the disengaged position with a one-way clamping system operatively connected to the deck.

4. A method as in claim 3 further comprising the step of applying a downward pressure to the plurality of boards by at least one friction plate adjacent the downstream end of the deck.

5. A method as in claim 3 wherein the one-way clamping-system includes at least one mechanically actuated clamp, the mechanically actuated clamp responsive to the position of the horizontal displacement system.

6. A method as in claim 3 further comprising the step of providing a flattening pressure against a plurality of boards on the deck.

7. A method as in claim 3 wherein the plurality of boards is a plurality of interlocked and finger-jointed boards further comprising the step of applying a longitudinal clamping pressure to the plurality of interlocked and finger-jointed boards using a longitudinal clamping system operatively connected to the deck.

* * * * *